April 14, 1959     J. H. DOTTER     2,881,785
AUTOMATIC FORCE-FEED LUBRICATED PLUG VALVE
Filed Feb. 21, 1956     2 Sheets-Sheet 1

John H. Dotter
INVENTOR.

April 14, 1959     J. H. DOTTER     2,881,785
AUTOMATIC FORCE-FEED LUBRICATED PLUG VALVE
Filed Feb. 21, 1956     2 Sheets-Sheet 2
Fig. 3
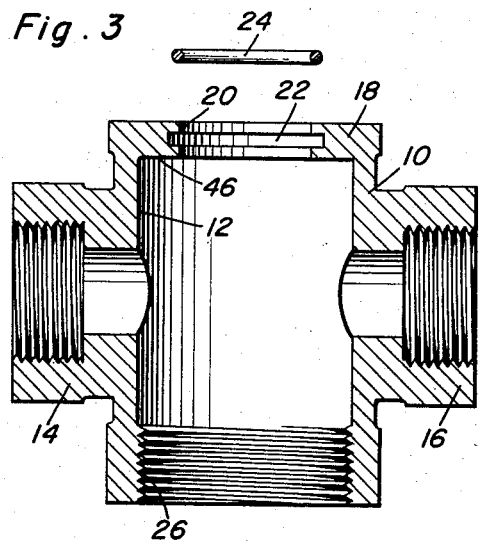
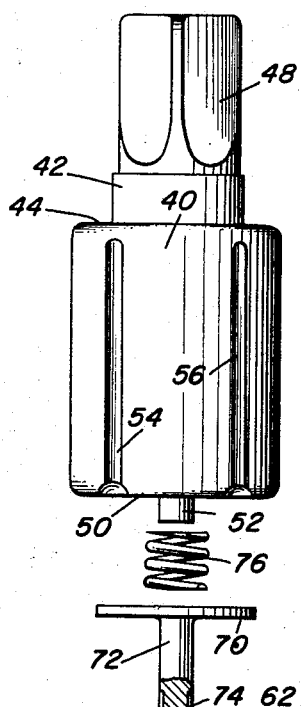
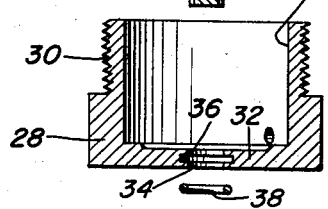
Fig. 4
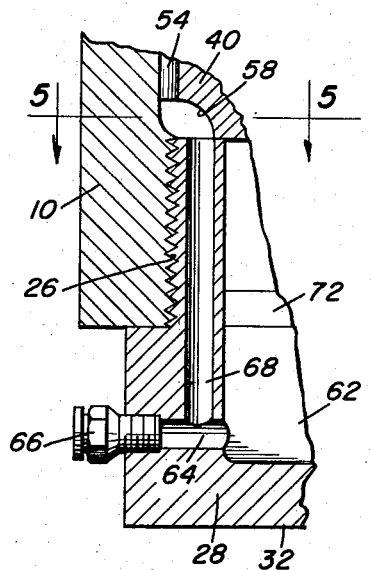
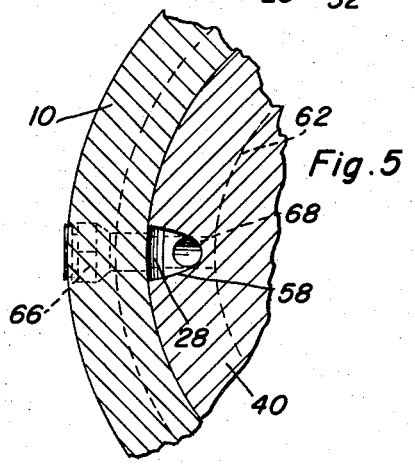
Fig. 5
John H. Dotter
INVENTOR.
BY *[signature]*
Attorneys United States Patent Office 2,881,785
Patented Apr. 14, 1959

2,881,785

AUTOMATIC FORCE-FEED LUBRICATED PLUG VALVE

John H. Dotter, Baltimore, Md.

Application February 21, 1956, Serial No. 566,904

6 Claims. (Cl. 137—246.21)

This invention comprises novel and useful improvements in an automatic force feed lubricated plug valve and more particularly relates to an improved lubricating system adapted to be built into a plug valve assembly for automatically lubricating the same.

The principal object of this invention is to provide an improved plug valve having an automatic force feed lubricating system incorporated therein.

A further object of the invention is to provide a lubricating system for plug valves in accordance with the foregoing object wherein a part of the force feed mechanism is utilized to provide a tell-tale as to the relative quantity of lubricant within the reservoir.

A further object of the invention is to provide a device in accordance with the preceding objects wherein lubricant may be supplied to the device with a conventional lubricant pressure gun or the like.

A still further important object of the invention is to provide a lubricated plug valve as set forth in the foregoing objects wherein the entire lubricant storage and force feeding system is carried by a closure plug for the valve chamber of the device and may be applied to or removed from the valve casing as a unitary assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a group perspective assembly view of the various elements forming the embodiment of the lubricated plug valve in accordance with Figures 1 and 2;

Figure 4 is a fragmentary detailed view taken upon a considerably enlarged scale of a portion of the construction of Figure 1, and showing in particular the relative arrangement of the lubricant passages in the closure plug, in the valve casing and the valve body of this invention; and, Figure 5 is a detailed view taken substantially upon the plane indicated by the section line 5—5 of Figure 4.

Figure 1:
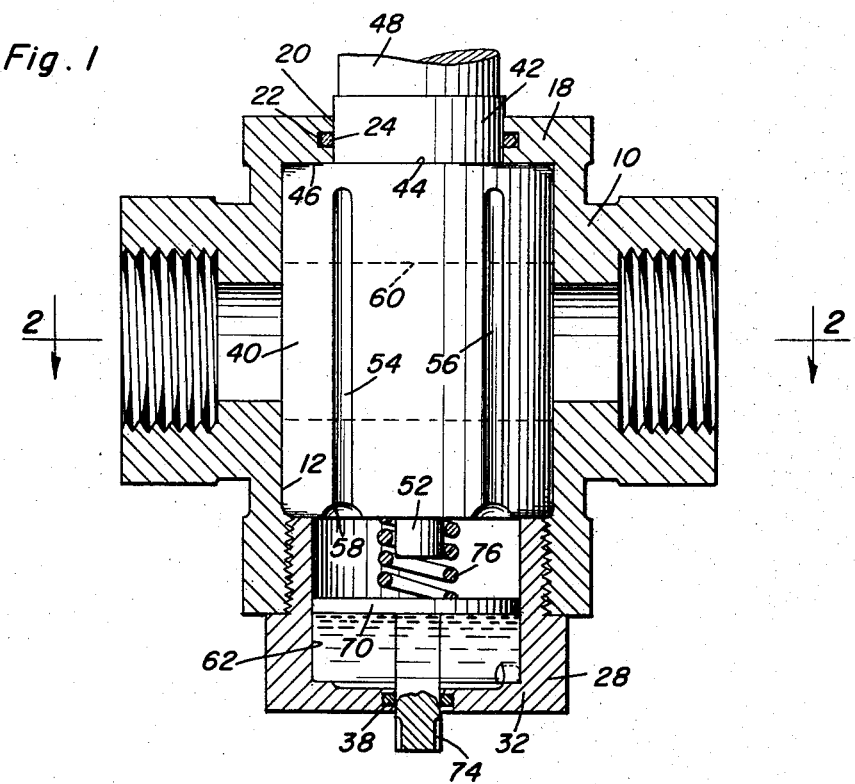
Figure 1 is a view in vertical central section through a suitable embodiment of a plug valve assembly incorporating therein the improved automatic force feed lubricating system of this invention, the device being shown in a normal position of operation with the lubricant reservoir being partially filled with lubricant.

In the embodiment illustrated in the drawings by way of example in a suitable manner practicing the principles of this invention, there is indicated generally by the numeral 10 a generally cylindrical valve body having a cylindrical valve chamber 12 therein, there being provided internally threaded tubular bosses 14 and 16 which constitute fluid inlet and outlet ports for the fluid medium controlled by the valve. As will be observed from Figures 1 and 2, one end of the casing is provided with a closed wall or partition 18 having an axial bore or aperture 20 extending therethrough and an annular groove 22 is formed therein for receiving an O-ring 24. The other end of the valve chamber has an internally threaded opening 26 for the reception of a closure plug or bushing 28 which is externally threaded at one extremity as at 30 for reception in the internally threaded portion 26.

The closure plug in turn is provided at its lower end with a partition or end wall 32, likewise axially apertured as at 34 and provided with an annular groove 36 for the reception of the O-ring 38.

A cylindrical valve body 40 is rotatably received in the valve chamber 12 and is insertable thereinto and removable therefrom through the open end 26 by removal of the closure plug 28. This valve body is provided with a cylindrical upwardly extending stem 42, receivable in the aperture 20 previously mentioned, and it will be understood that the sealing ring 24 cooperates with the portion 42 to provide a fluid-tight seal therewith. In addition, the upper shouldered surface 44 of the valve body is adapted to abut against the lower horizontal shoulder or surface 46 of the top wall 18 to assist in establishing a fluid-tight and a bearing engagement therewith.

The upper end of the stem 42 is provided with an end portion 48 by means of which the valve body is adapted to be rotated in any desired manner, not shown.

At its lower end, the valve body 40 is provided with a substantially horizontal bottom surface 50 and with an axially extending depending projection 52 for a purpose to be subsequently set forth. As will be best apparent from Figure 1, with the valve body in place in the valve chamber, the bottom surface 50 of the valve body will be engaged by the upper end of the externally threaded portion 30 of the closure plug 28, and thereby the valve will be retained seated against the upper annular surface of the closure plug and the lower horizontal annular surface 46 of the upper partition 18 of the valve casing, whereby the valve is mounted for snug rotation therein.

Extending upwardly from the lower end of the exterior surface of the valve body 40, are a plurality of circumferentially spaced axially extending channels or slots such as those indicated at 54 and 56. Conveniently, a plurality of the slots 54 and a further plurality of the slots 56 may be provided, and pairs of slots may be disposed diametrically opposite each other as will be apparent from Figure 2. The lower ends of these slots preferably terminate in slightly enlarged recesses each indicated by the numeral 58, and which open upon the bottom surface 50 of the valve body. These slots constitute lubricant passages and are continuously in communication with the cylindrical surface of the valve chamber 12 for supplying lubricant thereto in a manner to be subsequently apparent.

Figure 2:
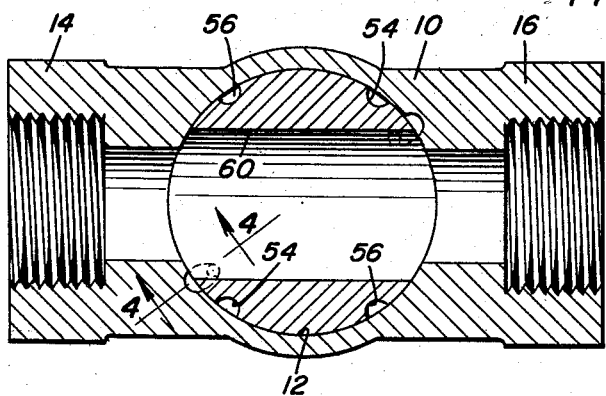
Figure 2 is a horizontal sectional view taken substantially upon the plane indicated by the section line 2—2 of Figure 1 and showing the relative arrangement of the lubricant passages in the valve plug and casing.

Extending diametrically through the valve body is a passage 60 which is so disposed as to establish communication between the inlet and discharge fluid passages 14 and 16, when the cylindrical valve body is in proper rotational adjustment, as will be apparent from Figure 2.

As will be best apparent from Figures 1 and 3, the cylindrical interior wall of the closure plug 28 constitutes a chamber comprising a lubricant reservoir 62. Adjacent the bottom of this reservoir is a laterally extending bore 64 and a nonreturn check valve assembly of a conventional type such as an Alemite fitting 66 is provided whereby lubricant may be supplied under pressure into the reservoir 62 from the passage 64 in a conventional and well understood manner. Thus, the lubricant reservoir may be supplied with lubricant under pressure as desired.

Disposed in the cylindrical wall of the closure plug 28 are a plurality of lubricating or lubricant passages 68, whose lower ends communicate with the bore 64 or with similar bores in order to be at all times in communication with the bottom portion of the lubricant reservoir 62. The upper ends of these lubricant passages open upon the upper annular surface of the closure plug whereby when the valve body is rotated into properly adjusted position, the lower ends of the lubricant passages 54 or 56 with their enlarged recesses 58 may be selectively placed in registration with the passages 68. As thus far described, it will be apparent that, by an examination of Figure 2, when the valve is in its open position as shown in Figure 2 to permit passage of the fluid controlled by the valve through the passage 60, the lubricant reservoir will be out of communication with the lubricating passages in the valve body. However, when the valve is turned in either direction from that shown in Figure 2, one or the other of the sets of lubricant passages in the valve body, 54 or 56, may be placed in registration with the passages 68 to thus supply lubricant under pressure to the adjacent surfaces of the valve body and the valve casing.

In order to facilitate the flow of lubricant from the reservoir to the lubricating passages on the valve body, means are provided for both maintaining the fluid in the reservoir under pressure and for providing a tell-tale to indicate when the reservoir needs replenishing and when the reservoir is full.

This means consists of a partition, diaphragm or piston 70 having a flat upper surface, and slidable with a snug fit in the lubricant reservoir 62, the piston having a depending stem 72 which is slidably received through the aperture 34 and the O-ring 38 disposed therein. At its lower extremity, the end of the stem 72 is provided with axially extending grooves or channels 74 upon its exterior surface. A compression spring 76 is seated upon the projecting depending extension 52 on the valve body and bears against the upper surface of the piston 70 to yieldingly urge the piston downwardly and also urge the valve body upwardly.

The operation of this lubricant pressure means is as follows:

When lubricant under pressure is supplied by the fitting 66 and the bore 64 into the lubricant reservoir 62, the same will enter below the piston 70, and through the pressure of the lubricant will urge the piston upwardly against the compression spring 76. If desired, this charging of the reservoir with lubricant under pressure may continue until the stem 72 has moved sufficiently upward to cause the upper ends of the slot 74 to move upwardly through the sealing ring 38 and clear the upper surface of the partition 32. At this time lubricant can now escape through the grooves 74, and by its escape will indicate that the reservoir has been filled to capacity.

When the source of lubricant supply is disconnected, the non-return valve assembly in the fitting 66 will retain the lubricant under pressure in the reservoir, and the spring 76 will by its action upon the piston 70 maintain this pressure in the reservoir; and through the passages 64, 68 will maintain this pressure available for operative communication with the recesses 58 and the lubricant passages 54 and 56 upon the exterior of the valve body, it being understood that the rotation of the valve body will selectively register one or more sets of the lubricant passages with the reservoir and thus insure the supply of lubricant under pressure to the contacting surfaces of the valve body in the valve casing.

As lubricant is used by the valve, it will be apparent that the spring 76 will constantly maintain a supply of the same under pressure, each time the passages in the vale body register with the passages in the closure plug. As the lubricant is exhausted from the reservoir, the piston 70 and its stem 72 will move downwardly, and consequently the extent or portion of the stem 72 which protrudes below the bottom wall 32 of the closure plug will provide a tell-tale or indication of the relative quantity of lubricant remaining in the reservoir.

It will be observed that by this construction the entire lubricant pressure supply means and the lubricant reservoir are all maintained within a removable closure plug, enabling the entire lubricant system to be readily removed for servicing or replacement, for inspection or as desired. Moreover, the spring 76 serves not only to maintain a substanially constant pressure upon the lubricant in the reservoir, but also serves to urge the valve body upwardly whereby a fluid-tight sealing engagement is provided between the top surface 44 of the valve body and the bottom surface 46 of the casing top wall 18.

The two O-ring assemblies 24 and 38 also provide lubricant seals at opposite ends of the valve casing.

Although the fluid pressure producing means of the reservoir has been indicated as consisting of a piston of a rigid nature, it is obvious that any desired means such as a diaphragm or other movable partition may be provided.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A lubricated plug valve comprising a valve casing having therein a valve chamber closed at one end by an end wall, fluid inlet and outlet passages in said casing intersecting said valve chamber, a valve body rotatably mounted in said chamber, a valve passage in said body registrable with said inlet and outlet passages, a closure plug in the other end of said valve chamber engaging the valve body and retaining the valve body against said end wall, a lubricant reservoir disposed entirely in said closure plug, a piston member slidable in said reservoir for applying pressure to the lubricant therein, lubricant passages in said closure plug in continuous communication with said reservoir, means establishing communication between said lubricant passages and between the valve body and the wall of the valve chamber, a spring positioned between and engaging said valve body and said piston member for urging the valve body against said end wall and for applying pressure upon the lubricant in said reservoir.

2. The combination of claim 1 including a non-return pressure fitting on said closure plug establishing communication with the lubricant reservoir.

3. The combination of claim 1 including an indicator carried by said piston member and extending through said closure plug visually indicating the quantity of lubricant in the reservoir.

4. The combination of claim 1 including an indicator carried by said piston member and visually indicating the quantity of lubricant in the reservoir, said piston member having a stem slidably disposed in and closing an aperture in the closure plug.

5. The combination of claim 4 wherein the projecting end of said stem constitutes said indicator.

6. A lubricated plug valve comprising a valve casing having a valve chamber therein closed at one end by an end wall, a valve body rotatably mounted in said chamber, a valve passage in said body registrable with fluid inlet and outlet passages in said casing, a closure plug for the other end of the valve chamber engaging the valve body for retaining the valve body against said end wall, a lubricant reservoir disposed entirely in said closure plug, means for maintaining pressure upon the lubricant in said reservoir, lubricant passages in said closure plug in continuous communication with the reservoir, lubricant channels in the valve body having open communication with the wall of the valve chamber, means establishing communication between selected ones of said channels and said lubricant passages only when the valve body is in selected rotationally adjusted position, said pressure means in said reservoir maintaining a substantially uniform pressure upon the lubricant therein, and an indicator carried by said last means and visually indicating the quantity of lubricant in the reservoir, said pressure means comprising a member slidably closing the reservoir and applying pressure to the lubricant therein, said member having a stem slidably disposed in and closing an aperture in the closure plug, the projecting end of said stem constituting said indicator, and having grooves therein for venting lubricant from the reservoir when the latter is substantially full.

References Cited in the file of this patent

UNITED STATES PATENTS

| | | |
|---|---|---|
| 940,689 | Hodgkinson | Nov. 23, 1909 |
| 1,182,878 | Standley | May 9, 1916 |
| 2,145,628 | Milliken | Jan. 31, 1939 |
| 2,281,697 | Kerr | May 5, 1942 |
| 2,565,609 | Jacobsen | Aug. 28, 1951 |

FOREIGN PATENTS

| | | |
|---|---|---|
| 484,239 | Great Britain | May 3, 1938 |